United States Patent
Carson et al.

(10) Patent No.: US 9,546,794 B1
(45) Date of Patent: Jan. 17, 2017

(54) HYBRID AIR CONDITIONING CONTROL PROCESS

(71) Applicants: William S Carson, Lake Wales, FL (US); Sylvia H Carson, Lake Wales, FL (US)

(72) Inventors: William S Carson, Lake Wales, FL (US); Sylvia H Carson, Lake Wales, FL (US)

( * ) Notice: Subject to any disclaimer, the term of this patent is extended or adjusted under 35 U.S.C. 154(b) by 359 days.

(21) Appl. No.: 14/054,436

(22) Filed: Oct. 15, 2013

Related U.S. Application Data

(63) Continuation-in-part of application No. 12/929,295, filed on Jan. 12, 2011, now abandoned.

(51) Int. Cl.
*F25B 49/00* (2006.01)
*F24F 3/14* (2006.01)

(52) U.S. Cl.
CPC ..................................... *F24F 3/14* (2013.01)

(58) Field of Classification Search
CPC . F24F 11/0008; F24F 11/0012; F24F 11/0015; F24F 2003/144; F24F 2011/0064; F24F 2203/02; F24F 3/14; G05D 22/02
See application file for complete search history.

(56) References Cited

U.S. PATENT DOCUMENTS

| | | | | |
|---|---|---|---|---|
| 3,059,448 A * | 10/1962 | McGrath | ................ | F24F 5/001 62/120 |
| 5,495,722 A * | 3/1996 | Manson | ............... | F24F 11/0009 236/51 |
| 6,079,219 A * | 6/2000 | Katsuki | ............... | F24F 11/0079 236/DIG. 9 |
| 2010/0312396 A1 * | 12/2010 | George | ................. | G05D 22/02 700/278 |

* cited by examiner

*Primary Examiner* — Len Tran
*Assistant Examiner* — Ana Vazquez
(74) *Attorney, Agent, or Firm* — William M. Hobby, III

(57) ABSTRACT

The present invention is a process of controlling a hybrid central air conditioning system that incorporates multiple air treatment devices operated by a process controller reacting to an input of either a comfort or an energy saving program and which uses temperature and humidity sensors that matches specific air treatment machines to varying air treatment needs, such as humidity control to maximize air conditioning performance while minimizing energy use. A timed test cycle is used to make corrections to the selected program based on a timed reading of the temperature and humidity sensors.

16 Claims, 3 Drawing Sheets

| AC EQUIPMENT AVAILABLE FOR PROCESS SELECT | ENERGY USE IN WATTS | "ON OR OFF" VARIABLE CONDITIONS | OPERATIONAL USE TIME PER WEATHER YEAR |
|---|---|---|---|
| Dehumidifier (12) | 500 | Air Temperature Within Comfort Band Settings – Humidity Above Comfort Range | 20% |
| Air Conditioner (11) [1-Ton Capacity] | 1500 | Temperatures Are Mildly Above Comfort Band Settings | 20% |
| Air Conditioner (11) AND Dehumidifier (12) | 2000 | Temperatures And Humidity Are Mildly Higher | 15% |
| Air Conditioner (10) [2-Ton Capacity] | 2500 | Temperatures Moderately Above Comfort Settings | 20% |
| Air Conditioner (10) AND Dehumidifier (12) | 3000 | Temperatures And Humidity Are Moderately Above Air Comfort Sets | 5% |
| Air Conditioner (10) AND Air Conditioner (11) [3-Ton AC Combined Capacity] | 4000 | "Hottest Days" of Summer Conditions – Max Comfort Settings | 20% |

*FIG. 4*

HYBRID AIR CONDITIONING CONTROL PROCESS

This application is a continuation-in-part of our prior U.S. patent application Ser. No. 12/929,295, filed Jan. 12, 2011 for Hybrid Air Conditioning System which claimed the benefit of U.S. Provisional Application No. 61/336,090, filed Jan. 19, 2010.

BACKGROUND OF THE INVENTION

The present invention relates to controlling the treatment of air for the inside of a building and especially to controlling a hybrid air conditioning system for the regulation of the air temperature and humidity utilizing independently operative air conditioning units of differing capacity and an independently operative dehumidifier to control indoor air conditions.

The present invention is in the technical field of air treatment for inside air comfort and indoor air quality. More particularly, the present invention is in the technical fields of ventilation, cleaning, cooling, heating, and humidity treatment of inside air. More particularly, the present invention is in the technical fields of equipment and controls for performing inside air comfort and air quality treatments of inside air. The conventional "central air conditioning system" is generally a single unit of a fixed or restricted capacity sized as the largest machine required to cool down a building's interior air on the hottest of days with the highest of heat loads within a relatively short time period. This high level of capacity and power use is typically only needed for approximately one third of the year, meaning that the equipment is over-sized and using more energy than needed to condition interior air for the remaining two-thirds of the year, resulting in problems such as energy wasting overcooling and "reheats" to control humidity. Inside air treatment needs shift during this "off-season" two-thirds period from the priority function of high heat control by the central air conditioner to that of a need for smaller cooling capacities or for alternate air treatment needs such as control of humidity levels. In these situations, smaller cooling capacity equipment (such as a window unit) or a unit dedicated to a specific function, such as humidity control, can provide superior inside air treatment at significantly lower energy use and costs to the consumer.

What is needed in order to optimally comfort condition inside air at the lowest energy inputs and costs is a process control that can match specific air comfort conditioning treatments to the optimum size and type equipment designed to best handle each task, using the lowest power consumption by flexibly matching units to changing conditions. With a conventional central air conditioning system, the installation is generally the largest machine needed to cool down a buildings interior air, on the hottest of days with the highest of heat loads, within the relatively short time period necessary to achieve acceptable comfort. This high level of air conditioning power use however is typically only needed for a part of the year, meaning that the equipment is over-sized and uses more energy than needed to comfort condition interior air for the remaining two-thirds of the year. In addition, the air comfort and air quality treatment needs shift from the primary function of heat control by the central air conditioner in summer months to that of controlling other factors, such as humidity, when air temperatures are moderate or mild during fall and spring periods but humidity levels can build up because the cooling function of the air conditioner is not being activated for direct cooling (salient heat removal) of the interior air so as to also indirectly remove water vapor by condensation (latent heat removal) to lower the humidity. In such an example, the invention herein described would detect the increase in humidity level and activate the dedicated dehumidifier to dehumidify the air without running the larger air conditioner which would also lower the air temperature, often to a level where a "reheat" function is needed to raise the air temperature back up to the Set comfort level, wasting energy. Similarly, using a smaller air conditioner to cool condition low air heat demands, allows the smaller machine to operate more continuously at its Optimum design performance—running steadily and efficiently and effectively at a constant rate instead of over-cooling quickly and shutting on and off continuously. With oversized capacity on undersized loads, machine life suffers and breakdowns increase from the constant stops and start short run times of the oversized unit, and with such cycling comfort is compromised while energy is wasted as each cycle consumes considerable more energy than that of a longer running unit that matches the prevailing cooling demands.

A hybrid air conditioning system having plural separate air conditioning units and a separate dehumidifier in the present invention are controlled in a process to provide superior air treatment for inside air comfort while allowing user tradeoffs for priority control of either energy saving or more personal comfort.

SUMMARY OF THE INVENTION

The present invention is a process of controlling a hybrid central air conditioning system that incorporates multiple air treatment devices operated by a process controller reacting to sensors, that matches specific air treatment machines to varying air treatment needs, such as humidity control, to maximize air conditioning performance while minimizing energy use.

The process for conditioning the air in a building includes first selecting an air conditioning system in a building having a first air conditioning unit of predetermined capacity and a second air conditioning unit having an equal or smaller capacity than the first air conditioning unit and having a dehumidifier and having a process controller operatively connected to each said first and second air conditioner units and to said dehumidifier and having a control panel operatively connected to said process controller and having a temperature sensor for sensing temperature within said building and a humidity sensor for sensing humidity within the building both operatively connected to said process controller. The process then includes selectively inputting saving and comfort ranges into the control panel and into said control processor and then sensing the temperature and humidity in the building and transmitting the sensed temperature and humidity to the process controller. The first and second air conditioning units and the dehumidifier are selectively activated based on deviations from the use setting for either energy saving or maximum comfort. If maximum energy saving is selected, the smallest equipment combination is chosen and then automatically increased as needed to meet the setting requirements in timed test cycle. If maximum comfort has been selected, then the maximum equipment setting are started and run in a timed test cycle. The equipment is then operated based on the results from the test cycle after adjustments for temperature and humidity in the building for the selected inputs. That is the first and second air conditioning units and the dehumidifier are selectively activated based on the setting of either energy savings or comfort and the temperature and humidity sensor readouts in the building for a test period, starting at either minimum equipment usage for energy saving and adding equipment as determined from the timed test cycle or starting with maximum equipment for a maximum comfort level and reducing the equipment as needed based on the timed test cycle and the temperature and humidity in the building. By having the equipment in use running full time or mostly full time rather than having multiple equipment continuously cycling on and off, the overall efficiency of the equipment is improved. The air in a building is thereby conditioned with optimum or increased efficiency for either higher energy savings or enhanced comfort.

BRIEF DESCRIPTION OF THE DRAWINGS

The accompanying drawings, which are included to provide further understanding of the invention, are incorporated in and constitute a part of the specification, and illustrate an embodiment of the invention and together with the description serve to explain the principles of the invention.

FIG. 4 is a usage and energy table of one example of using the present invention.

DETAILED DESCRIPTION OF THE PREFERRED EMBODIMENT

Figure 1:
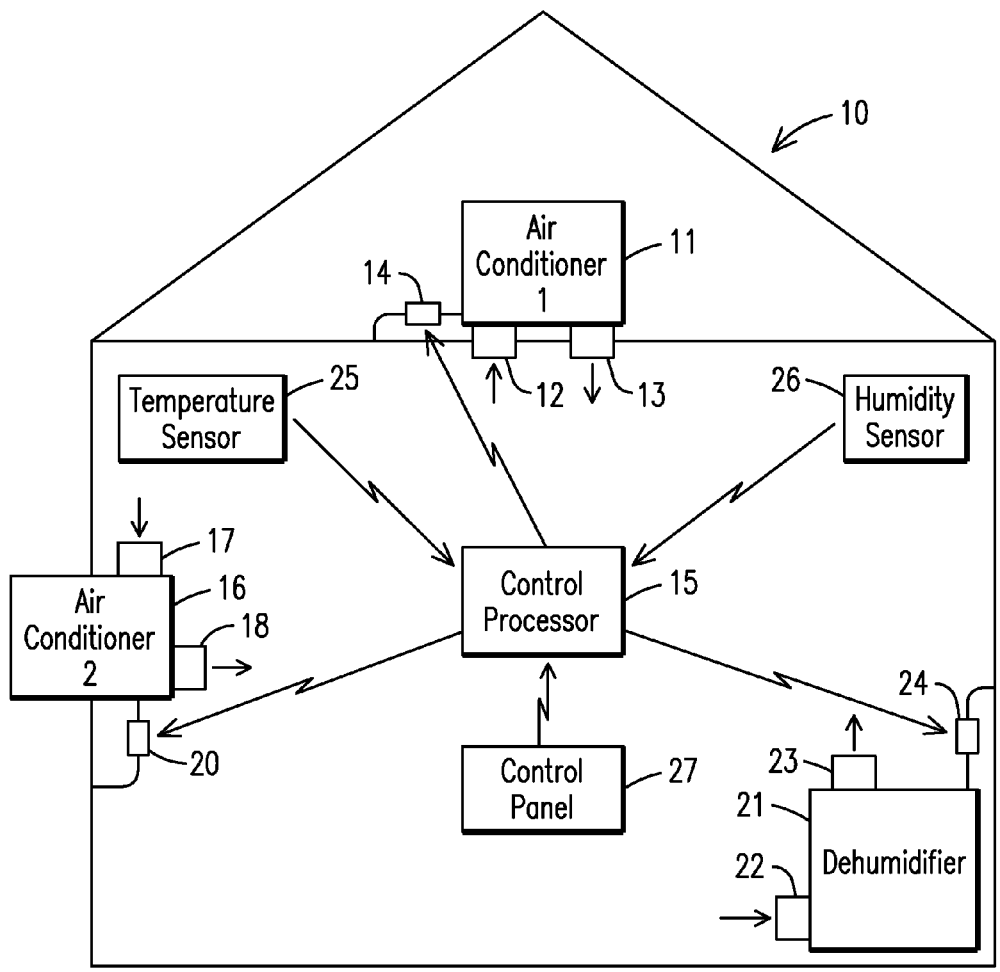
FIG. 1 is a diagrammatic view of a building having a hybrid air conditioning system in accordance with the present invention.

Referring now to the invention in more detail, FIG. 1 is a diagrammatic view of the present hybrid air conditioning system in a building having a first or principal central air conditioner unit 11, which includes a typical air conditioner or heat pump having a heat exchanger coil and air handler unit. The air conditioner unit 11 has an intake air duct 12 for drawing a building's inside air thereinto and an outlet air duct 13 for delivering the conditioned output air therefrom. The use of air conditioner herein includes the use of a reverse cycle air conditioner or heat pump. A wireless on-off switch 14 turns the air conditioning unit 11 on or off in accordance with signals from the control processor 15.

A self-contained second or auxiliary air conditioner or heat pump unit 16 has the same or a smaller capacity than the principal air conditioner unit 11 and also has an intake air supply 17 or return air duct 18. A wireless on-off switch 20 controls when the air conditioning unit 16 comes on responsive to the control processor 15.

The hybrid system of the present invention has a self-contained and independently operated dehumidifier unit 21, which dehumidifier has an air intake 22 and a return air duct 23. The dehumidifier unit 21, can be selectively operated as a stand alone unit to supply dehumidified air to a building, or in combination with the first and second air conditioner units 11 and 16. A wireless on-off switch 24 turns the dehumidifier 21 on or off in accordance with signals from the control processor 15.

The System information and mechanical components used by the process control include the following conventionally available air conditioning and related parts and equipment. The Process Control System Components includes: a first air conditioner 11; a second air conditioner 16; a dehumidifier 21; a sensor 25 for detecting dry bulb air temperatures; a sensor 26 for sensing humidity to detect inside air humidity or latent heat; an control controller 15 operatively connected to the other components for running the process to control the operation of the system; and a control panel 27 for user control of the said operations controller.

The system may be wired or wireless using RF transceivers or RFID technology using a central transceiver or RFID tags to monitor and run the system.

The System Components operating either separately or in combination process the inside air of an interior space by taking in the inside air and treating the inside air for temperature and humidity control purposes, and expelling the treated inside air back into the interior space and where the total capacity of the First and Second air conditioners 11 and 16 would approximate the total capacity of a standard installation for a single air conditioner for the same application, and where the second air conditioner 16 is preferably of a lower capacity than the first air conditioner 11 but can also be of equal output. System components can be flexibly placed for convenience, low installation costs, easier servicing, and overall performance, by using wireless connections to the process controller 15. The maximum efficiency of an A/C system is accomplished when an A/C system runs more or less continuously rather than being continuously cycled on and off and also for the moisture being removed from the air.

Figure 2:
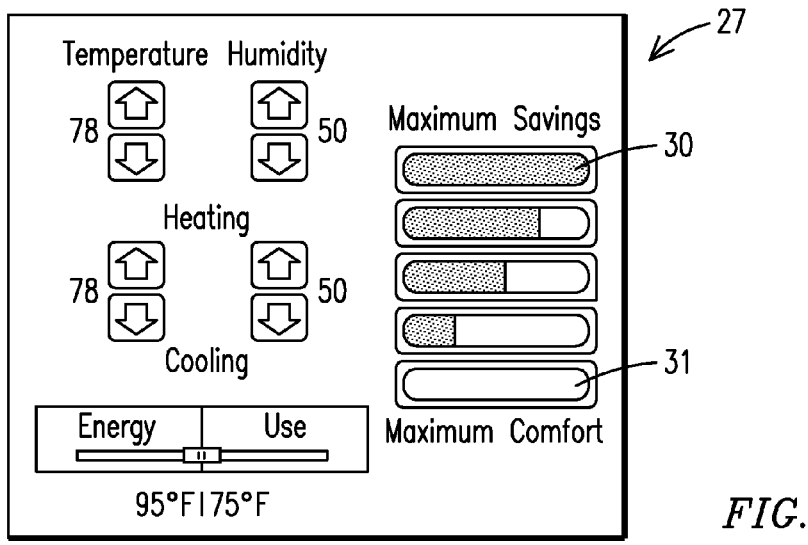
FIG. 2 is a control panel for controlling a hybrid air conditioning system in accordance with FIGS. 1 and 3 showing user fixed points and user variable range setting for efficiency or comfort choice.

The process controller 15 is initially controlled with the control panel 27 which has user inputs as more clearly seen in FIG. 2. The user sets desired comfort temperature and humidity set points similar in manner to setting a conventional thermostat, but the new process control normally does not use such fixed settings to make frequent changes for different comfort and energy demands. Instead, the new process uses a much simpler and easier "Save" or "Comfort" push-the-button command to automatically direct the optimum response to achieve the optimum level of either savings or comfort priority. The user directs the system to either Save Energy or to provide more comfort at any one time and period on an as-desired basis, preferably selecting from a range between a full "Maximum Saving" or full "Maximum Comfort" to achieve the desired cost-to-comfort tradeoff level between these two opposites that the user wants in priority operation during any current operating period, long or short. As seen in FIG. 2, the right hand side of the of the control panel 27 has a series of bar displays with settings starting at the top with a maximum saving display having the top horizontal bar fully covered for a maximum saving setting while the bottom bar 31 has the display uncovered for the maximum comfort setting with the least energy saving while the bars in between have various degrees of energy savings as indicated by the bar displays.

The installer or servicer inputs the system components available and users and building characteristics to be operated by the process control 15 which consists of a "First" air conditioner 11 and Second air conditioner 16 and a dehumidifier 21 for a total operating system of available process control air treatment inputs and components. Each component preferably has a wireless transceiver for wirelessly turning on or off the switches 14, 20 and and receiving temperature and humidity readings from the sensors 25 and 26. An RFID system may be used for receiving sensed reading from the sensors 25 and 26. The amount of allowable deviation from the user's desired comfort settings for inside temperature and humidity then operate as a "dead band" range where the process control will not operate the system components to maintain the exact set-points entered by the user if energy savings is the priority. For example, the technician may select in the control panel 27 a maximum operating energy saving "spread" of 5 degrees from the user temperature settings and 10 percentage points from user humidity setting, as that range will not operate any components if Maximum Energy Savings has been selected by the user. An intermediate user's selection for energy savings versus comfort may reduce the allowable dead band spread before equipment component activation. Alternatively, a user's selection of maximum comfort will not allow any deviation from the user main settings before equipment component activation by the process control program. If Maximum Savings is chosen, the equipment with be cycled on from low to high to meet the minimum use of energy while if the Comfort setting is chosen, the equipment will be cycle from high to low in the test cycle.

Figure 3:
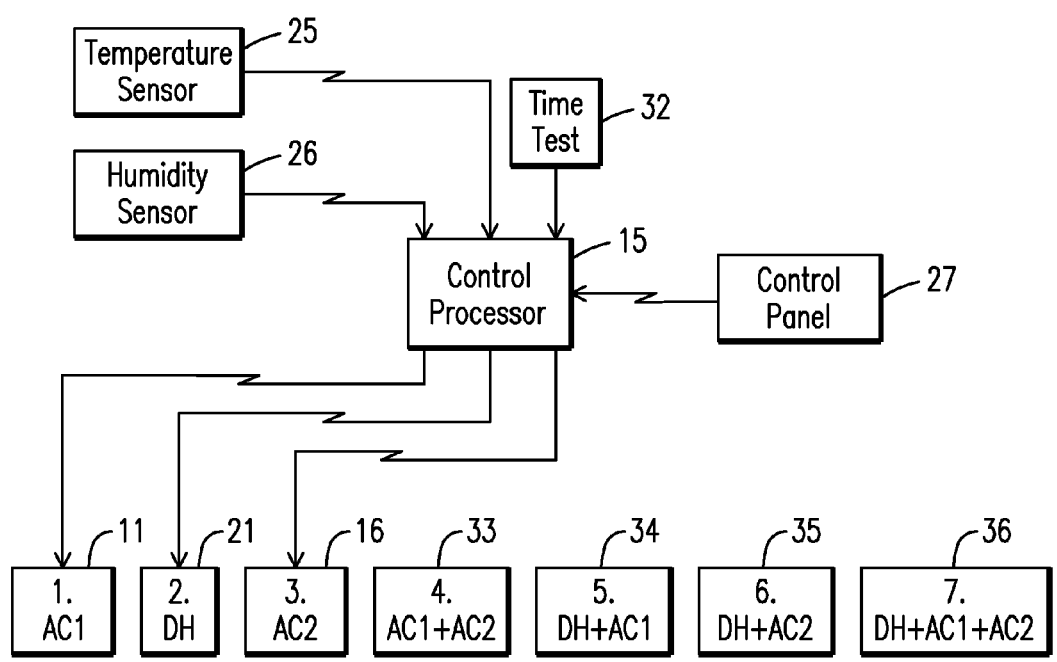
FIG. 3 is a flow diagram of the process for controlling a hybrid air conditioning system in accordance with the present invention.

The control process start up and sequencing of the system components as seen in FIG. 3 is dependent on the user's current choice between either saving more energy or achieving the most comfort during the chosen operating cycle, coupled with the readings of the sensors 25 and 26 of inside temperature and humidity feedback. A test process 32 is incorporated into the system with a feedback from sensors 25 and 26 and to the process controller 15 used to assure that the settings and criteria are being met. There is a delay time interval before a test of the operating performance of the current component choices to check if the user's temperature and humidity setting deviations (savings versus comfort selections) are being met without changing the current selection of operational components. The process controller 15 uses a secondary sequencing of the system components and time intervals following receiving the test results if the prior component selection does not meet the user's desired performance.

The system control process is more clearly seen in FIG. 3. Once the system user and installer control instructions are entered in the control panel 27, the process controller 15 is "triggered" by changes in sensors 25 and 26 showing a deviation from the user's desired settings for main inside temperature and humidity levels. The direction of the change for a rise or fall of temperature instructs the control program if cooling or heating is needed. The process controller 15 reads the user's current command selection from the control panel 27 to prioritize component operations to either produce more energy savings or more comfort.

If the user's selection on the control panel is for saving energy, and the deviation from setpoint exceeds the dead band allowable deviation from the user's definitive setpoint, the process control will instruct the controller to begin component operations by using the least energy consuming component or components first (as input by the installer), and to then test that effect on the fixed setpoints or on the allowable deviations from the main setpoints when energy savings has been selected as the current priority.

If the user's display 27 selection is for comfort first, the process controller 15 will instruct the components to begin operations by using the component or components that will most quickly effect the level of inside air comfort (but using more energy), in order to bring the deviation(s) from temperature and/or humidity back to the user's main setpoint comfort settings as soon as possible.

After employing an equipment selection for addressing the savings or comfort scale deviation from user set-point temperature and humidity desired levels, the process control program will direct the control processor to begin a test period delay time that provides the system with a time period (input) to treat the air and to then check for the results of that equipment component selection for either (1) moving the deviation from set-point(s) back toward the user's main set-point where continued movement to the main set-point should reach the component "shut off" command; or (2) holding the deviation from set-point deviation range from any continuing displacement away from the main set-point; or (3) if the deviation is moving more away from the user's desired set-point deviation range for main temperature or humidity levels inside.

If the "test" period shows that the first choice above and the user has selected energy savings, current control processor 15 will instruct the process controller to try a lower energy consuming component or combination of components if available, and to then run the test program again to see the results of that operation on the inside temperature and humidity sensors 14 and 15 readings. If the operational setting are still returning to set-points, or holding at the allowable deviation from set-point, the process controller 15 will instruct the components to maintain that equipment selection until either the main set-point deviation is re-achieved for shut off, or the user changes his immediate selection for either more energy savings or for more comfort.

If the deviation spread increases, the control process will instruct the controller to select the next highest energy comfort equipment (11, 16, 21) and to then repeat the performance test for results. This consistent "try & test" of selecting the most efficient or effective available equipment for any task, insures that a minimum of energy consumption and costs is used at any time to maintain at least user specified, acceptable levels of comfort.

Referring to FIG. 3, an example of the process control response to a condition for a sensor indication for a rise in inside air temperature above the user's set-point (or deviation from) for temperature. The processor controller 15 represents the operational control device that executes the process control functions. The inside temperature and humidity sensors 25 and 26 communicate air conditions inside the building to the process controller 15. These readings are constantly compared to the user's entered choices into the process control for the main air temperature and humidity set-points. There are eight possible combinations of inside air conditions as shown in FIG. 3 including air conditioning unit 11, air conditioning unit 16, dehumidifier 21, each being run individually or in combination 33 of air conditioning unit 11 and air conditioning unit 16 or combination 34 of dehumidifier 21 and air conditioning unit 11 or combination 35 of dehumidifier 21 and air conditioning unit 16 or combination 36 of dehumidifier 21 and air conditioning unit 11 and air conditioning unit 16. Each combination has a different process control response. In this illustration of the process control, the sensor indication of a temperature rise is above the user's main temperature set-point with the humidity holding at set-point. This first read for the process control is part of a continuous loop-checking for any sensor deviation(s) from the user's main comfort set-points.

In this illustrative control process case, if the humidity sensor indication has also changed, the dual sensor deviations would have likely changed the equipment choices to be used by the process controller 16 to correct the situation. The process controller 16 then reads the current choice of the user as to either "SAVE" energy or to achieve "COMFORT" as a current priority. Normally in this system, the user would not change his set-points of preferred inside temperature and humidity levels, but would instead use the easier user commands which allow the user to instantly select with a button-push between saving more energy at less costs, or to get more comfort at higher costs, as a quick and easy command for the process control.

In one illustrative scenario, the user selects "SAVE" and the system installer has programmed in to start with the smaller air conditioner 16 from the 7 different combinations available to the process controller. This equipment choice instructs the process control to select air conditioning unit 16 first, and to test to see if using this smaller unit can achieve the desired cooling result using the low costs of running the smaller air conditioner unit over the other options of air conditioning unit 11 or air conditioning unit 11 plus air conditioning unit 16 (maximum).

In one scenario on startup, the process controller 15 then goes into test mode using air conditioning unit 16 which test is being monitored by the inside temperature sensor 25 and constantly communicated to the process controller 15. This Time Test has three possible indicators for the process control. First, the reading of the inside air temperature can show that the temperature is coming back down toward user set-point, at which end point air conditioning unit 16 would be shut down or second, the time test could show that the temperature is holding steady but within the allowable deviation from set-point allowed by the process control input commands as set by the AC installer or service representative. In such case the process control would keep the air conditioning unit 16 unit in operation. Third, if the deviations of air temperature continues to increase away from the user set-point, then the process controller 15 will turn off air conditioning unit 16 and start the larger cooling unit air conditioning unit 11 to achieve more cooling. This equipment selection would start a new timed test cycle to check on the cooling results of using this equipment choice as for one of the three results above. The temperature and humidity reading results in either the combination air conditioning unit 16 as primary A/C or air conditioning unit 11 where the temperature spread from set-point is still increasing, would cause the process control to go to equipment components air conditioning unit 11 plus air conditioning unit 16 with both units combined to increase cooling to the maximum.

If the user had selected "COMFORT" as the currently desired command, the process control would have used the air conditioning unit 11 plus air conditioning unit 16 equipment choice immediately to achieve the highest possible level of comfort regardless of energy consumption and costs. This process control highlights user incentives to "save". Anytime the process control program is running equipment to match inside conditions back to or to maintain user set-point conditions or deviations from set-points, the process control test program runs continuously to ensure that the optimum equipment package is being used at the right time to achieve the user's choice for the tradeoff of either more savings or more comfort at a particular time or operating cycle, all automatically.

FIG. 4 is a tabular illustration of a use of the invention to achieve energy savings. FIG. 4 shows how the present hybrid air conditioning system with an integrated equipment package and process control thereof, selectively matches the inside air comfort needs to an optimum energy-saving combination of dedicated equipment capacities and treatment choice options needed to more efficiently achieve the desired results. In FIG. 4, the power is reduced from a standard central air conditioning system by approximately 80% down to 20% by limiting the use of the equipment to just the highest demand periods for which it was selected and installed, and to instead use the invention to process-operate equipment, which is now selectively available to use less energy. The self-contained first air conditioner unit 11, and the second self contained air conditioner unit 16, and the self contained dehumidifier unit 21, can connect and combine together for greater efficiency or comfort. Equipment units 11, 16, and 21 have certain elements and common functions of the individual units, such as electrical hookups and water condensate drain outlets which elements can be combined in the hybrid air conditioning system of the present invention using shared connections. Additionally, the air conditioning units 11 and 16 and the dehumidifier 21 are located separately but may use common air flow ducts as desired. The invention system and process controller 16 can also be expanded and programmed for other air conditioning needs such as humidification in heating climates, or air cleaning devices, or for ventilation. The processing control can also control other energy consuming devices such as for timing a water heater cycle, if desired. The process controller 15, sensors 25 and 26, and equipment is preferably wireless but can also be wired if desired. The process controller can be accessed, programmed, and controlled remotely via internet, phone line, power lines, or wireless connections, without limitation.

The process control sensors and equipment described can be wired or wireless, and said process controller could be remotely accessed, programmed, and controlled remotely via internet phone line, power lines or wireless connections, without limitation to additionally reduce service calls and maintenance costs.

The advantages of the present invention include, without limitation, that it saves air conditioning operational energy and costs and delivers increased comfort and air quality; by use of the process control for selective matching of the specific air conditioning treatments needed or desired to an expanded range of the more effective and efficient equipment; made available by the process control that offers varying power levels and air treatment capabilities automatically available as alternatives to the sole use of a single, conventional size air conditioning unit operating in just an on or off, high power consumption configuration.

The invention also provides utility power suppliers with an interface to reduce air conditioning energy consumption during peak periods and offers customers controls to reduce rates at off-peak use. The invention also provides users with air conditioning backup in case of a failure of a single unit, and less subject to harmful short-cycling on and off whereas the new process control offers longer life and fewer repairs on equipment by spreading the operational uses to the best alternative equipment choices over time and running the equipment at design peak efficiency and effectiveness.

In the broad embodiment, the present invention is a new process control for multiple air conditioning devices, either singly or in combinations, for automatically achieving higher efficiency and comfort, by using the new invention process control for selective use of dedicated air conditioning equipment of varying size and treatment capabilities, based on sensor derived air conditions compared to specified user comfort setting needs, that can save energy and costs by selectively specifying the optimum mix of equipment to meet a specific building and user needs, with the least use of energy with comfort, at minimal costs.

The present invention saves air conditioning operational energy and costs and delivers increased comfort and air quality, by the selective matching of the specific air conditioning treatments needed or desired, to the expanded range of invention equipment now available and offers varying power requirements and air treatment capabilities, that are now automatically available as alternatives to the sole use of a conventional size air conditioning unit.

In the broad embodiment, the present invention is a new type of air conditioning system for automatically achieving higher efficiency and comfort, using the new process control for selective use of the dedicated air conditioning equipment of varying size and treatment capabilities, based on sensor derived air conditions compared to specified user comfort setting needs that can save energy and costs by selectively specifying the optimum mix of equipment needed to meet a specific building and user with the least use of energy.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples which are to be considered illustrative rather restrictive.

We claim:

1. A process for conditioning air in a building comprising the steps of:
    selecting an air conditioning system in the building having a first air conditioning unit of predetermined capacity and a second air conditioning unit having an equal or smaller capacity than the first air conditioning unit and having a dehumidifier and having a process controller wirelessly connected to each said first and second air conditioner units and to said dehumidifier and having a control panel having energy saving or comfort operating priority inputs and being operatively coupled to said process controller, said air conditioning system also having a temperature sensor for sensing temperature within said building and a humidity sensor for sensing humidity within the building both sensors being operatively connected to said process controller;
    selectively inputting energy saving and comfort operating priorities into said control panel and into said control processor;
    sensing the temperature and humidity in said building with said temperature sensor and said humidity sensor and transmitting the sensed temperature and humidity reading to the process controller;
    selectively activating said first and second air conditioning units and said dehumidifier for a timed test cycle to determine the resultant temperature and humidity in the building for the selected inputs; and
    selectively activating said first and second air conditioning units and said dehumidifier based on the temperature and humidity sensor readouts during the timed test period to further adjust the temperature and humidity in the building responsive to the timed test period for greater comfort or greater efficiency in said building;
    whereby the air in the building is conditioned with either increased efficiency for more energy savings or maximum comfort.

2. The process for conditioning air in a building in accordance with claim 1 in which the step of selectively inputting said operating priorities includes inputting said energy saving priority into said control panel which first activates said second air conditioning unit for said timed test period.

3. The process for conditioning air in a building in accordance with claim 1 in which the step of selectively inputting said operating priorities includes inputting said comfort priority into said control panel which first simultaneously activates said first and second air conditioning units for said timed test period.

4. The process for conditioning air in a building in accordance with claim 1 in which said process controller has a wireless connection to a wireless on-off switch connected to said first and second air conditioning units and to said dehumidifier.

5. The process for conditioning air in a building in accordance with claim 4 in which said process controller has a wireless connection to said temperature sensor and a wireless connection to said humidity sensor.

6. The process for conditioning air in a building in accordance with claim 5 in which said process controller has a wireless connection to said control panel.

7. The process for conditioning air in a building in accordance with claim 5 including the step of running a second timed test cycle following changes made in response to said first timed test cycle.

8. A process for treating air inside a building comprising the steps of:
    selecting an air conditioning system in a building having a first air conditioning unit of predetermined capacity and a second air conditioning unit having an equal or smaller capacity than the first air conditioning unit and having a dehumidifier and having a process controller operatively connected to each said first and second air conditioner units and to said dehumidifier and having a control panel operatively connected to said process controller and having a temperature sensor for sensing temperature within said building and a humidity sensor for sensing humidity within the building both operatively connected to said process controller;
    sensing the temperature and humidity within the building;
    selecting either a comfort or energy saving scale on said control panel to activate said process controller;
    selectively activating said selected air conditioning system first and second air conditioning units and said dehumidifier to run a test cycle and testing the temperature and humidity of the building air responsive to the timed test cycle; and
    controlling the air in the building responsive to the temperature and humidity of the building air following the timed test cycle with a selected combination of said air conditioning system first and second air conditioning units and said dehumidifier;
    whereby air inside a building is controlled with increased efficiency over a conventional dedicated air conditioning system.

9. The process for conditioning air inside in a building in accordance with claim 8 in which the step of selectively inputting said operating priorities includes inputting said energy saving priority into said control panel which first activates said second air conditioning unit for said timed test period.

10. The process for conditioning air in a building in accordance with claim 9 in which the step of selectively inputting said operating priorities includes inputting said comfort priority into said control panel which first simultaneously activates said first and second air conditioning units for said timed test period.

11. The process for conditioning air in a building in accordance with claim 8 in which said process controller has a wireless connection to said first and second air conditioning units and to said dehumidifier.

12. The process for conditioning air in a building in accordance with claim 11 in which said process controller has a wireless connection to a wireless on-off switch connected to said first and second air conditioning units and to said dehumidifier.

13. The process for conditioning air in a building in accordance with claim 11 in which said process controller has a wireless connection to said first and second air conditioning units and to said dehumidifier.

14. The process for conditioning air in a building in accordance with claim 13 in which said process controller has a wireless connection to said temperature sensor and to said humidity sensor.

15. The process for conditioning air in a building in accordance with claim 14 in which said process controller has a wireless connection to said control panel.

16. The process for conditioning air in a building in accordance with claim 15 including the step of running a second timed test cycle following changes made in response to said first timed test cycle.

\* \* \* \* \*